UNITED STATES PATENT OFFICE 2,357,559

METHOD OF SWEETENING SOUR GAS AND PREVENTING CORROSION OF OIL PRODUCING WELLS

Thomas O. Smith, Odessa, Tex., assignor to Odessa Chemical and Equipment Company, Odessa, Tex.

No Drawing. Application August 24, 1942, Serial No. 455,954

3 Claims. (Cl. 252—8.55)

This invention relates to a method of treating natural gas and oil for the purpose of greatly reducing or eliminating the high percentage of hydrogen sulphide found in some localities so as to permit the utilization of the natural hydrocarbon products heretofore unfit for commercial purposes and also to eliminate the rapid corrosion of well tubing which has occurred heretofore in wells producing crude oil mixed with water containing hydrogen sulphide.

I am aware of the fact that various methods have been devised for removing hydrogen sulphide from oil while being refined and for preventing corrosion of equipment used in oil cracking operations. As far as I am aware, however, no method is now known in the various oil fields whereby the product is treated at or in the producing well to remove the hydrogen sulphide from sour gas or for preventing corrosion of the well tubing by water containing hydrogen sulphide, while the same is flowing within and from the well.

It is a fact well known to those skilled in the art that, in some localities, and more especially in the oil and gas fields of Texas, the hydrogen sulphide content of the product is so high that a vast amount of the product is not used but is wasted, special treatments, adding materially to the cost of production, being required to eliminate the objectionable hydrogen sulphide after the product selected for commercial purposes has left the well and reached the treatment plant.

It has been long recognized that while oil without water but containing hydrogen sulphide will not corrode metal with which it contacts, any mixture of oil and water with said sulphur content will cause great damage in the well.

The present invention has for an object the inexpensive treatment of the natural product before it leaves the well so that water therein, if mixed with hydrogen sulphide, is prevented from corroding the tubing in the well.

In carrying out the present method an amount of aqua ammonia containing a solution (substantially 10%) of sulphonated fatty acid (vegetable or animal) is poured into the producing well between the casing and tubing. This acts to produce a thin protective film on the outer surface of the tubing as the mixture flows downwardly within the well. Ultimately the mixture is picked up by the oil as it travels upwardly within the tubing, either naturally or under the action of a pump, and, as a result, a protective film is applied to the inner surface of the tubing. The film thus constitutes an inhibitor to prevent the water containing the hydrogen sulphide from attacking the metal and causing corrosion.

If the well produces a gas containing up to 56 grains or more per thousand feet of hydrogen sulphide, it has been found in practice that this content can be reduced to as much as 5 grains or less per thousand feet. The method followed is to direct aqua ammonia into the gas stream either in the well or in the line close to the well. In a test performed in a line under pressure as high as 850 pounds per square inch, samples of the treated gas were taken at various distances from the point of treatment. It was found that under these conditions the gas, after traveling 2,000 feet had lost the ammonia vapor, had been practically freed of hydrogen sulphide and had become suitable for commercial purposes.

Under some conditions it has been found possible to use an ammonium salt such as ammonium chloride, in a container located where the sour gas will pass through it. This has acted as a filter or purifier and as the gas leaves the container it will carry therewith enough of the ammonium gas to reduce the hydrogen sulphide content as desired.

What is claimed is:

1. The method of treating a hydrocarbon product in its natural state for the purpose of reducing its hydrogen sulphide content where water is present and preventing corrosion of well tubing, which includes the step of mixing with the hydrocarbon in an active well a solution of substantially 10% sulphonated higher fatty acid in substantially 90% aqua ammonia.

2. The method of treating a hydrocarbon product in its natural state for the purpose of reducing its hydrogen sulphide content and preventing corrosion of well tubing which includes the step of pouring between the casing and tubing of a well while flowing under natural or forced pressure, a mixture of substantially 10% sulphonated higher fatty acid and substantially 90% aqua ammonia, thereby to deposit a protective film upon the outer surface of the tubing and, with the outflowing hydrocarbon, to deposit a protective film on the inner surface of the tubing.

3. The method of coating well equipment with a protective film to prevent corrosion of the metal parts contacted in a well by salt water and sulphur-containing oils, which includes the step of supplying the oil at the bottom of a flowing well with a mixture of aqua ammonia substantially 90% and sulphonated higher fatty acids substantially 10%, thereby to deposit a protective film on the metal elements and reduce the hydrogen sulphide content of the oil.

THOMAS O. SMITH.